US012764644B2

(12) United States Patent
Dash et al.

(10) Patent No.: US 12,764,644 B2
(45) Date of Patent: Oct. 13, 2026

(54) RESELECTION OF A RADIO ACCESS TECHNOLOGY (RAT) FOR A MULTIMODE USER EQUIPMENT (UE)

(71) Applicant: Apple Inc., Cupertino, CA (US)

(72) Inventors: Deepak Dash, Bengaluru (IN); Parvez Sheikh, Bengaluru (IN); Prasad P. Ashtekar, Bavaria-Bayern (DE); Bernd H. Kemmer, Eichenau (DE)

(73) Assignee: Apple Inc., Cupertino, CA (US)

( * ) Notice: Subject to any disclaimer, the term of this patent is extended or adjusted under 35 U.S.C. 154(b) by 788 days.

(21) Appl. No.: 17/950,940

(22) Filed: Sep. 22, 2022

(65) Prior Publication Data

US 2023/0085782 A1 Mar. 23, 2023

(30) Foreign Application Priority Data

Sep. 23, 2021 (IN) ............................. 202141043141

(51) Int. Cl.

| | |
|---|---|
| ***H04W 48/18*** | (2009.01) |
| ***H04W 48/08*** | (2009.01) |
| ***H04W 60/00*** | (2009.01) |
| *H04W 88/06* | (2009.01) |

(52) U.S. Cl.

CPC ........... *H04W 48/18* (2013.01); *H04W 48/08* (2013.01); *H04W 60/00* (2013.01); *H04W 88/06* (2013.01)

(58) Field of Classification Search

CPC ..... H04W 48/18; H04W 48/08; H04W 60/00; H04W 88/06; H04W 48/16; H04W 60/04

(Continued)

(56) References Cited

U.S. PATENT DOCUMENTS

2012/0302241 A1* 11/2012 Klingenbrunn ....... H04W 48/18 455/436

2013/0189988 A1* 7/2013 Alonso-Rubio .. H04W 36/0088 455/436

(Continued)

FOREIGN PATENT DOCUMENTS

CN 104320819 A 1/2015
CN 110476457 A 11/2019

(Continued)

OTHER PUBLICATIONS

First Examination Report for Indian Application No. 202141043141 mailed Jul. 26, 2023, 7 pages.

(Continued)

*Primary Examiner* — Huy C Ho

(74) *Attorney, Agent, or Firm* — Sterne, Kessler, Goldstein & Fox P.L.L.C.

(57) ABSTRACT

Some aspects of this disclosure relate to apparatuses and methods for the reselection of a Radio Access Technology (RAT) for a multi-mode user equipment (UE). A UE can determine that the UE camps on a first RAT for service by a first public land mobile network (PLMN) and that the UE camps on a second RAT for service by a second PLMN, and store information about the first RAT for the first PLMN. The UE can further determine whether there is a trigger event to enable the UE to switch from the second RAT to the first RAT. In response to a determination that there is the trigger event, the UE can determine whether a cell in the first RAT for the first PLMN is available for the UE to camp on to select the available cell in the first RAT to register the UE with the first PLMN.

20 Claims, 7 Drawing Sheets

(58) Field of Classification Search
USPC .......................................................... 455/435.2
See application file for complete search history.

(56) References Cited

U.S. PATENT DOCUMENTS

| | | | | |
|---|---|---|---|---|
| 2013/0316699 | A1 | 11/2013 | Jheng et al. | |
| 2016/0345246 | A1 | 11/2016 | Xing et al. | |
| 2018/0041935 | A1* | 2/2018 | Jung | H04W 48/18 |
| 2022/0086747 | A1* | 3/2022 | Bucknell | H04W 48/18 |

FOREIGN PATENT DOCUMENTS

| | | | |
|---|---|---|---|
| CN | 110719613 | A | 1/2020 |
| CN | 110858990 | A | 3/2020 |
| CN | 111034275 | A | 4/2020 |
| EP | 3758421 | A1 | 12/2020 |
| WO | WO 2019071877 | A1 | 4/2019 |

OTHER PUBLICATIONS

3GPP TS 38.300 V15.6.0, (Jun. 2019), Technical Specification 3rd Generation Partnership Project; Technical Specification, "Group Radio Access Network"; NR; NR and NG-RAN Overall Description; Stage 2 (Release 15), Jun. 30, 2019, 99 pages.

ETSI TS 138 304 V15.6.0, (Jan. 2020), 5G; NR; "User Equipment (UE) procedures in idle mode and in RRC Inactive state", (3GPP TS 38.304 version 15.6.0 Release 15), Jan. 30, 2020, 32 pages.

Chinese Office Action directed to Chinese Patent Application No. 202210674290.2, mailed Dec. 17, 2025; 12 pages.

* cited by examiner

RESELECTION OF A RADIO ACCESS TECHNOLOGY (RAT) FOR A MULTIMODE USER EQUIPMENT (UE)

CROSS-REFERENCE TO RELATED APPLICATIONS

This application claims priority to Indian Application No. 202141043141, entitled "RESELECTION OF A RADIO ACCESS TECHNOLOGY (RAT) FOR A MULTI-MODE USER EQUIPMENT (UE)", filed Sep. 23, 2021, the contents of which are hereby incorporated by reference herein in its entirety.

BACKGROUND

Field

The described aspects generally relate to the reselection of a radio access technology (RAT) for a multi-mode user equipment (UE) supporting multiple RATs.

Related Art

A radio access technology (RAT) is the underlying physical connection for a radio based wireless communication network. A multi-mode user equipment (UE) can support several RATs in one device such as Bluetooth, Wi-Fi, global system for mobiles (GSM), universal mobile telecommunications system (UMTS), or long-term evolution (LTE). In addition, the 3rd Generation Partnership Project (3GPP) has developed a new RAT known as fifth generation (5G) New Radio (NR) RAT. A multi-mode UE supporting several RATs can provide flexibility and conveniences to the users. However, it is desired to improve the operational efficiency for a multi-mode UE.

SUMMARY

Some aspects of this disclosure relate to apparatuses and methods for implementing mechanisms for the reselection of a Radio Access Technology (RAT) for a multi-mode user equipment (UE). A multi-mode UE can wirelessly communicate in at least a first RAT and a second RAT, such as a RAT different from a fifth generation (5G) New Radio (NR) RAT and the NR RAT. The NR RAT can provide more services to the user, but NR networks may not be available all of the time and in all situations. Sometimes, a UE can communicate in the first RAT for service by a first public land mobile network (PLMN). When the first RAT is not available, the UE can store information about the first RAT for the first PLMN, and communicate in the second RAT for service by a second PLMN. The UE can further determine whether to switch back from the second RAT to the first RAT, which may be referred to as the reselection of the first RAT. For the reselection of the first RAT, the UE can determine whether a cell in the first RAT for the first PLMN is available for the UE to camp on, and select the available cell in the first RAT to register the UE with the first PLMN.

Some aspects of this disclosure relate to a multi-mode UE. The UE can include one or more transceivers and a processor communicatively coupled to one or more transceivers. The one or more transceivers can enable the UE to wirelessly communicate in a first RAT and a second RAT. In some embodiments, the first RAT includes NR next generation Radio Access Network (NG-RAN), and the second RAT includes Universal Mobile Telecommunications System (UMTS) Terrestrial Radio Access Network (UTRAN), a Global System for Mobiles (GSM) Edge Radio Access Network (GERAN), or a long-term evolution (LTE) evolved UTRAN (E-UTRAN).

In some embodiments, the processor can be configured to determine that the UE camps on the first RAT for service by a first PLMN, and store information about the first RAT for the first PLMN. In some embodiments, the processor can be configured to determine that the UE camps on the first RAT for service by the first PLMN by a non-access stratum (NAS) layer of a protocol stack operated on the UE. In some embodiments, the information about the first RAT for the first PLMN includes a specific mobile country code (MCC) for the first PLMN and a specific mobile network code (MNC) for the first PLMN. In some embodiments, when the service in the first RAT is interrupted, the UE can camp on the second RAT for service by a second PLMN. In some embodiments, the second PLMN is same as the first PLMN or an equivalent PLMN to the first PLMN.

In some embodiments, the UE can determine whether there is a trigger event to enable the UE to switch from the second RAT back to the first RAT. In response to a determination that there is the trigger event, the UE can determine whether a cell in the first RAT for the first PLMN is available for the UE to camp on. In some embodiments, the processor can fetch an access point assisted data provided by an access point to determine whether a cell in the first RAT for the first PLMN is available. In response to a determination that a cell in the first RAT for the first PLMN is available, the UE can select the available cell in the first RAT to register the UE with the first PLMN. The processor can further register the UE with the first RAT in the available cell based on the stored information about the first RAT.

In some embodiments, in response to the determination that there is the trigger event, and a determination that that there is no cell of the first PLMN available, the processor of the UE can be configured to start a timer with a predetermined duration. Upon an expiration of the timer with the predetermined duration, the processor can search for the first PLMN to determine whether the first PLMN is available. In response to a determination the first PLMN is available, the processor can determine whether a cell in the first RAT for the first PLMN is available for the UE to camp on. In response to a determination that a cell in the first RAT for the first PLMN is available, the processor can select the available cell in the first RAT to register the UE with the first PLMN.

In some embodiments, the timer is a first timer, and the UE can include a second timer. In response to the determination that there is the trigger event, the determination that the first PLMN is available, and a determination that that there is no cell in the first RAT for the first PLMN available, the processor can be further configured to start the second timer with a second predetermined duration. Upon an expiration of the second timer with the second predetermined duration, the processor can search for the first PLMN to determine whether the first PLMN is available. In response to a determination the first PLMN is available, the processor can determine whether a cell in the first RAT of the first PLMN is available for the UE to camp on. In response to a determination that a cell in the first RAT for the first PLMN is available, the processor can select the available cell in the first RAT to register the UE with the first PLMN.

In some embodiments, in response to a determination that there is no trigger event, the processor can start a timer with a predetermined duration. Upon an expiration of the timer with the predetermined duration, the processor can search for the first PLMN to determine whether the first PLMN is available. In response to a determination the first PLMN is available, the processor can determine whether a cell in the first RAT for the first PLMN is available for the UE to camp on. In response to a determination that the cell in the first RAT of the first PLMN is available, the processor can select the available cell in the first RAT to register the UE with the first PLMN.

In some embodiments, the timer is a first timer, and the UE can include a second timer. In response to the determination that there is no trigger event, and a determination that the first PLMN is not available, the processor can start a second timer with a second predetermined duration. Upon an expiration of the second timer with the second predetermined duration, the processor can search for the first PLMN to determine whether the first PLMN is available. In response to a determination the first PLMN is available, the processor can determine whether a cell in the first RAT for the first PLMN is available for the UE to camp on. In response to a determination that a cell in the first RAT of the first PLMN is available, the processor can select the available cell in the first RAT to register the UE with the first PLMN.

Some aspects of this disclosure relate to a method performed by a UE. The method includes determining that the UE camps on a first RAT for service by a first PLMN and that the UE camps on a second RAT for service by a second PLMN; and storing information about the first RAT for the first PLMN. The method further includes determining whether there is a trigger event to enable the UE to switch from the second RAT to the first RAT. In response to a determination that there is the trigger event, the method includes determining whether a cell in the first RAT for the first PLMN is available for the UE to camp on; and in response to a determination that a cell in the first RAT for the first PLMN is available, selecting the available cell in the first RAT to register the UE with the first PLMN.

Some aspects of this disclosure relate to non-transitory computer-readable medium storing instructions. When executed by a processor of a UE, the instructions stored in the non-transitory computer-readable medium cause the UE to perform various operations. The operations include determining that the UE camps on a first RAT for service by a first PLMN and that the UE camps on a second RAT for service by a second PLMN; and storing information about the first RAT for the first PLMN. The operations further include determining whether there is a trigger event to enable the UE to switch from the second RAT to the first RAT. In response to a determination that there is the trigger event, the operations include determining whether a cell in the first RAT for the first PLMN is available for the UE to camp on; and in response to a determination that a cell in the first RAT for the first PLMN is available, selecting the available cell in the first RAT to register the UE with the first PLMN.

This Summary is provided merely for purposes of illustrating some aspects to provide an understanding of the subject matter described herein. Accordingly, the above-described features are merely examples and should not be construed to narrow the scope or spirit of the subject matter in this disclosure. Other features, aspects, and advantages of this disclosure will become apparent from the following Detailed Description, Figures, and Claims.

BRIEF DESCRIPTION OF THE FIGURES

The accompanying drawings, which are incorporated herein and form part of the specification, illustrate the present disclosure and, together with the description, further serve to explain the principles of the disclosure and enable a person of skill in the relevant art(s) to make and use the disclosure.

Figure 1:
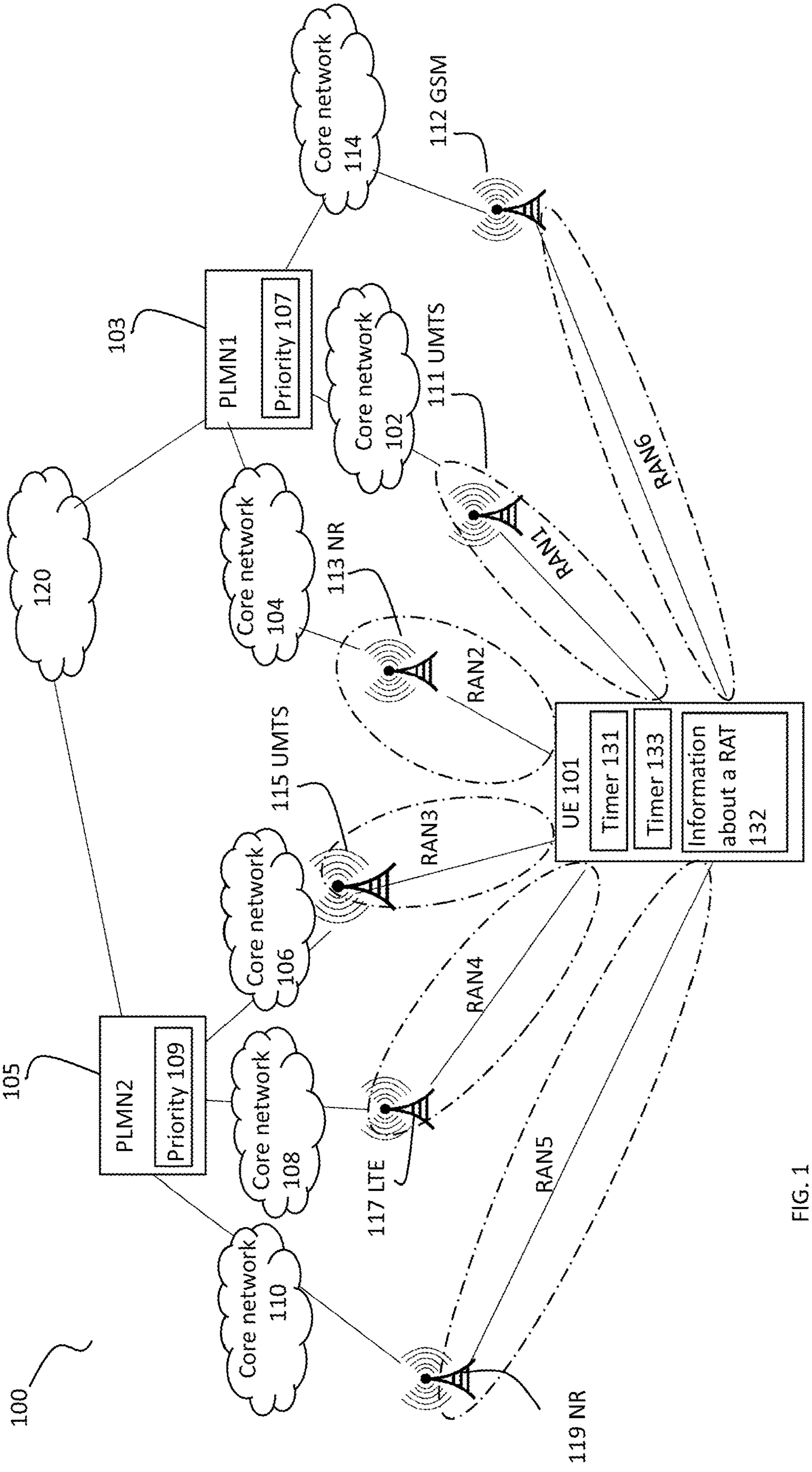
FIG. 1 illustrates a wireless system including a multi-mode user equipment (UE) configured to perform the reselection of a radio access technology (RAT) among multiple RATs, according to some aspects of the disclosure.

The present disclosure is described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION

A multi-mode user equipment (UE) can support multiple radio access technologies (RATs) for wireless communication such as Bluetooth, Wi-Fi, global system for mobiles (GSM), universal mobile telecommunications system (UMTS), long-term evolution (LTE), or fifth generation (5G) new radio (NR). Sometimes, a UE can communicate in the first RAT for service by a first public land mobile network (PLMN). When the first RAT is not available, the UE communicates in a second RAT for service by a second PLMN. The UE can further determine whether to switch back from the second RAT to the first RAT, which may be referred to as the reselection of the first RAT. The reselection is different from a general selection of a RAT, which may be a RAT used by the UE for the first time. Instead, when the UE performs the reselection of a RAT, the UE has used the RAT previously. For example, when a UE communicates in the NR RAT, the UE can switch to a less advanced RAT, such as the $2^{nd}$ generation (2G) or the $3^{rd}$ generation (3G) RAT in various situations. In some embodiments, the UE can switch to a 2G/3G RAT from the NR RAT when the UE is out of service of the NR RAT, or to conserve power for less services, or for other reasons. When the NR service is available, and there is enough power available, the UE may switch back to the more advanced NR RAT by performing the NR RAT reselection.

However, the current wireless technology may not support efficient mechanisms for the reselection from older technologies, such as technologies for the 2G or the 3G RAT to a newer technology, such as the NR RAT. Hence when a UE previously has communicated in the NR RAT, and currently camps on a 2G/3G RAT, in order to reselect the NR RAT, the UE may have to go through the normal RAT selection, or indirect reselection by hopping from the 2G/3G RAT to a LTE RAT, before switching form the LTE RAT to the NR RAT. Such mechanisms based on RAT selection or indirect reselection can be time consuming and expensive when being applied to the reselection of the NR RAT. Other reselection mechanisms may have conditions on the system, such as imposing a limit on the network structure or priority of the PLMN.

Embodiments herein present mechanisms for the reselection of a RAT so that the UE can quickly return to the RAT previously used, which can save power and improve the performance. A UE can communicate in a first RAT for service by a first PLMN. When the first RAT is not available, and the UE communicates in the second RAT for service by a second PLMN. Before switching to the second RAT, the UE can store information about the first RAT for the first PLMN. The saved information can include a specific mobile country code (MCC) for the first PLMN and a specific mobile network code (MNC) for the first PLMN. The saved information about the first RAT for the first PLMN can be used later for the reselection of the first RAT for the first PLMN without searching for a PLMN blindly. For example, the UE can search whether a cell in the first RAT for the first PLMN is available for the UE to camp on when the UE decides to switch back to the first RAT. The mechanisms can be applied to the situation when the UE communicates in a GSM RAT, a UMTS RAT, or a LTE RAT when other mechanism of currently applicable solutions of returning back to a NR RAT is not applicable. In addition, the mechanisms can be applied to any situation when the UE performs the reselection of a first RAT from a second RAT.

FIG. 1 illustrates a wireless system 100 including a multi-mode UE, e.g., UE 101, configured to perform the reselection of a RAT among multiple RATs, according to some aspects of the disclosure. Wireless system 100 is provided for the purpose of illustration only and does not limit the disclosed aspects. Wireless system 100 can include, but is not limited to, UE 101, a base station 111, a base station 112, a base station 113, a base station 115, a base station 117, and a base station 119, a PLMN 103, a PLMN 105, and various core networks, such as a core network 102, a core network 104, a core network 106, a core network 108, a core network 110, and a core network 114, all communicatively coupled to a core network 120.

According to some aspects, base station 111, base station 112, base station 113, base station 115, base station 117, and base station 119 can be a fixed station or a mobile station. Base station 111, base station 112, base station 113, base station 115, base station 117, and base station 119 can also be called other names, such as a base transceiver system (BTS), an access point (AP), a transmission/reception point (TRP), an evolved NodeB (eNB), a next generation node B (gNB), a 5G node B (NB), or some other equivalent terminology. In some examples, base station 111, base station 112, base station 113, base station 115, base station 117, and base station 119 can be interconnected to one another and/or to other base station or network nodes in a network through various types of backhaul interfaces such as a direct physical connection, a virtual network, and/or the like, not shown.

According to some aspects, UE 101 can be a multi-mode UE supporting multiple RATs. UE 101 can be stationary or mobile. UE 101 can be a cellular phone (e.g., a smart phone), a personal digital assistant (PDA), a wireless modem, a wireless communication device, a handheld device, a laptop, a desktop, a cordless phone, a wireless local loop station, a wireless sensor, a tablet, a camera, a video surveillance camera, a gaming device, a netbook, an ultrabook, a medical device or equipment, a biometric sensor or device, a wearable device (smart watch, smart clothing, smart glasses, smart wrist band, smart jewelry such as smart ring or smart bracelet), an entertainment device (e.g., a music or video device, or a satellite radio), a vehicular component, a smart meter, an industrial manufacturing equipment, a global positioning system device, an Internet-of-Things (IoT) device, a machine-type communication (MTC) device, an evolved or enhanced machine-type communication (eMTC) device, or any other suitable device that is configured to communicate via a wireless medium. For example, a MTC and eMTC device can include, a robot, a drone, a location tag, and/or the like.

According to some aspects, base station 111 can be a UMTS base station, and UE 101 can wirelessly communicate in a first RAT with base station 111 in RAN1, which can be a UMTS terrestrial radio access network (UTRAN). Base station 111 and core network 102 can form a UMTS wireless communication system. In addition, base station 113 can be a NR base station, and UE 101 can wirelessly communicate in a second RAT with base station 113 in RAN2, which can be a next generation radio access network (NG-RAN). Base station 113 and core network 104 can form a NR wireless communication system. Base station 112 can be a GSM base station, and UE 101 can wirelessly communicate in a RAT with base station 112 in RAN6, which can be a GSM edge radio access network (GERAN). Base station 112 and core network 114 can form a GSM wireless communication system. Furthermore, base station 111 and the UTRAN, base station 112 and the GERAN, base station 113 and the NG-RAN are managed by the same PLMN 103. PLMN 103 can have a priority 107.

According to some aspects, base station 115 can be a UMTS base station, and UE 101 can wirelessly communicate in a RAT with base station 115 in RAN3, which can be a UMTS terrestrial radio access network (UTRAN). Base station 115 and core network 106 can form a UMTS wireless communication system. Moreover, base station 117 can be a LTE base station, and UE 101 can wirelessly communicate in a RAT with base station 117 in RAN4, which can be a LTE evolved UTRAN (E-UTRAN). Base station 117 and core network 108 can form a LTE wireless communication system. In addition, base station 119 can be a NR base station, and UE 101 can wirelessly communicate in a RAT with base station 119 in RAN5, which can be a NG-RAN. Base station 119 and core network 110 can form a NR wireless communication system. Furthermore, base station 115 and the UTRAN, base station 117 and the E-UTRAN, and base station 119 and the NG-RAN are managed by PLMN 105. PLMN 105 can have a priority 109.

According to some aspects, UE 101 can include one or more timers, such as a timer 131 and a timer 133. In addition, UE 101 can save or store information about a first RAT for a PLMN, such as information about a RAT 132, which can be used for UE 101 to perform reselection of the first RAT when UE 101 communicates in a second RAT.

Figure 2A:
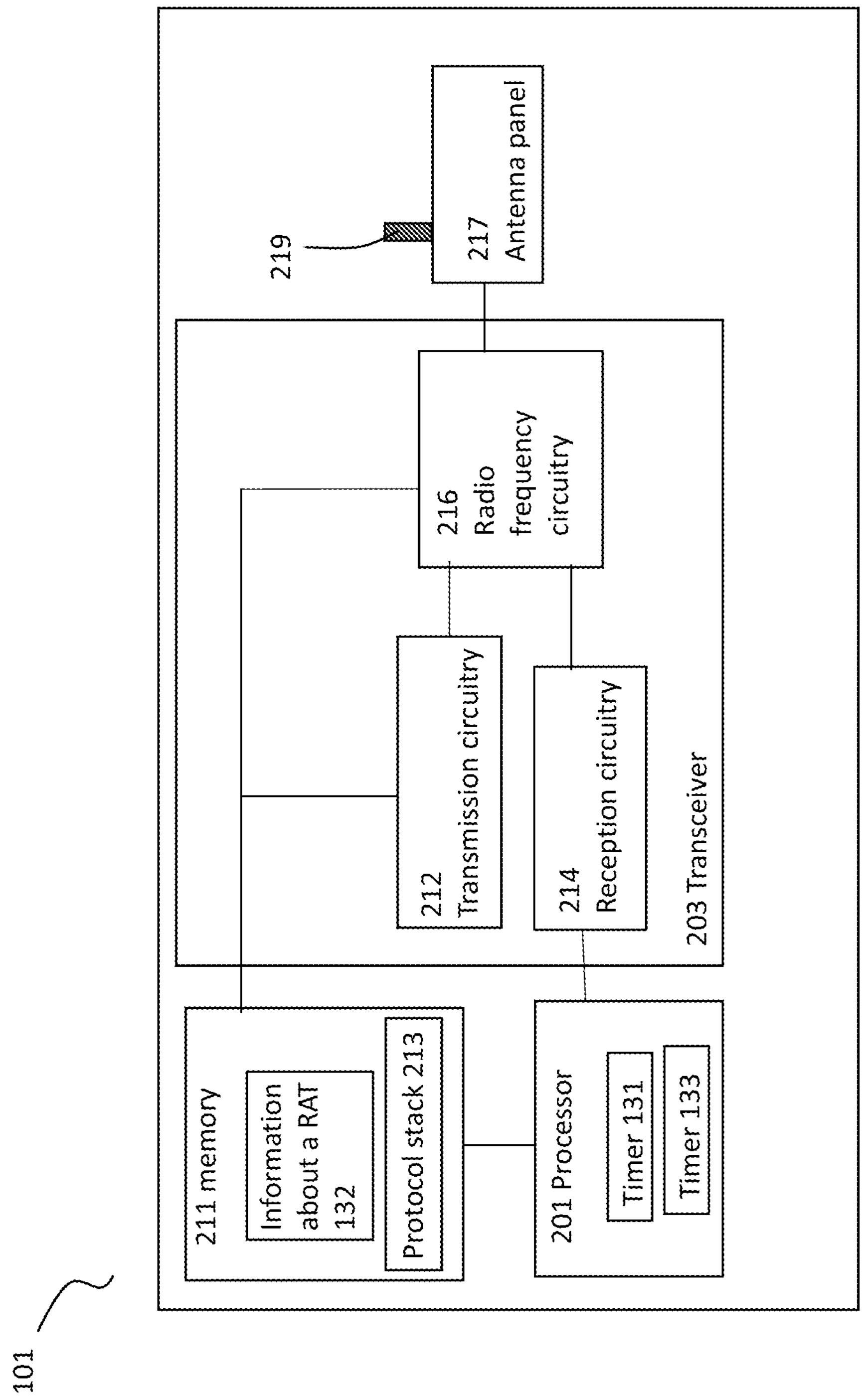
FIGS. 2A-2B illustrate block diagrams of a UE to perform functions described herein, according to some aspects of the disclosure.
Figure 2B:
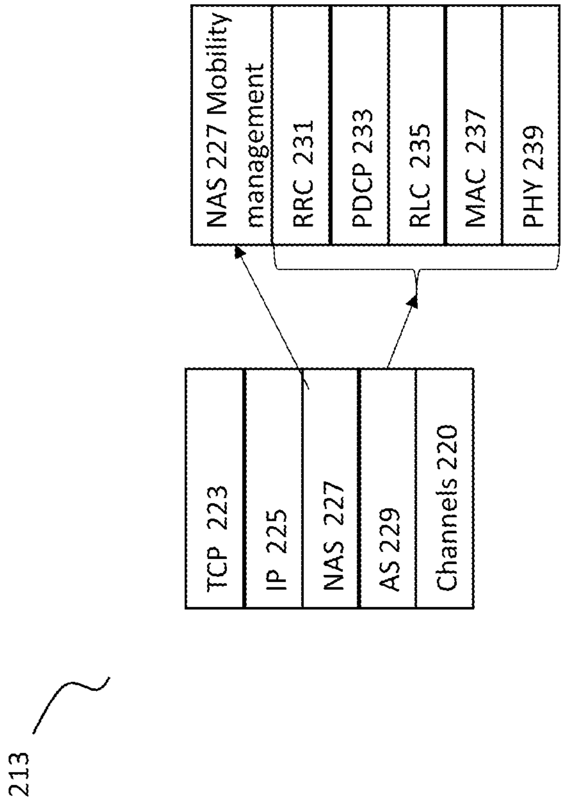

FIGS. 2A-2B illustrate block diagrams of UE 101 to perform functions described herein, according to some aspects of the disclosure.

FIG. 2A illustrates a block diagram of UE 101, having antenna panel 217 including one or more antenna elements, e.g., an antenna element 219 coupled to transceiver 203 and controlled by processor 201. In detail, transceiver 203 can include radio frequency (RF) circuitry 216, baseband transmission circuitry 212, and baseband reception circuitry 214. RF circuitry 216 can include multiple parallel RF chains for one or more of transmit or receive functions, each connected to one or more antenna elements of the antenna panel. In addition, processor 201 can be communicatively coupled to a memory device 211, which are further coupled to transceiver 203. There can be multiple transceivers, which can be similar to transceiver 203, not shown.

In some embodiments, transceiver 203 can enable the UE 101 to wirelessly communicate in a first RAT and a second RAT. In some embodiments, the first RAT includes a NG-RAN, and the second RAT includes a UTRAN, a GERAN, a LTE E-UTRAN, or some other RAT.

In some embodiments, RF circuitry 216 is used by UE 101 to transmit and receive signals or data. Memory device 211 can store information about a RAT 132. In addition, memory device 211 can store information about an example protocol stack 213. As shown in FIG. 2B, protocol stack 213 can include a transport (TCP) layer 223, an IP layer 225, a non-access stratum (NAS) layer 227, an access stratum (AS) layer 229, and a channel 220. AS layer 229 can include multiple sublayers, such as RRC layer 231, packet data convergence protocol (PDCP) layer 233, radio link control (RLC) layer 235, medium access control (MAC) layer 237, and physical (PHY) layer 239.

In some embodiments, processor 201 can perform various functions, such as functions for timer 131 and timer 133, and operate protocol stack 213. Memory device 211 can include instructions, that when executed by the processor 201, causes the processor 201 to perform the functions for the reselection of a RAT among multiple RAT technologies. Alternatively, the processor 201 can be "hard-coded" to perform the functions described herein.

In some embodiments, processor 201 can determine that UE 101 camps on the first RAT for service by a first PLMN, and store information about the first RAT for the first PLMN, such as information about a RAT 132. In some embodiments, the first RAT can be a NR RAT, as shown in the NR wireless network including base station 113 and core network 104, serviced by PLMN 103. In some embodiments, the processor can be configured to determine that UE 101 camps on the first RAT for service by the first PLMN by NAS layer 227 of protocol stack 213 operated on UE 101. In some embodiments, the information about the first RAT for the first PLMN includes a specific mobile country code (MCC) for the first PLMN and a specific mobile network code (MNC) for the first PLMN, e.g., PLMN 103. In some embodiments, when the service in the first RAT is interrupted, UE 101 can camp on the second RAT for service by a second PLMN. In some embodiments, the second PLMN is same as the first PLMN or an equivalent PLMN to the first PLMN. An equivalent PLMN is a PLMN that provides equivalent services as the first PLMN provides. In some embodiments, the second RAT can be a UTRAN RAT, as shown in the UTRAN wireless network including base station 111 and core network 102, serviced by PLMN 103.

In some embodiments, processor 201 can determine whether there is a trigger event to enable UE 101 to switch from the second RAT back to the first RAT. In response to a determination that there is the trigger event, processor 201 can determine whether a cell in the first RAT for the first PLMN is available for the UE to camp on. Processor 201 can make such a determination based on the stored information about the first RAT for the first PLMN. Since information about the first PLMN is saved already, processor 201 can determine whether a cell in the first RAT for the first PLMN is available, without searching for a PLMN before determining the availability of a cell, which is a wireless communication cell served by a base station. Accordingly, the saved information about a RAT 132 can improve the efficiency of the reselection of the first RAT from the second RAT. In some embodiments, processor 201 can fetch an access point assisted data provided by an access point to determine whether a cell in the first RAT for the first PLMN is available.

In some embodiments, in response to a determination that a cell in the first RAT for the first PLMN is available, processor 201 can select the available cell in the first RAT to register the UE with the first PLMN. In addition, processor 201 can further register the UE with the first RAT in the available cell based on the stored information about the first RAT.

In some embodiments, processor 201 can perform various operations for the reselection of the first RAT based on various situations, depending on whether a trigger event can be detected or determined by UE 101. When there is no explicit trigger detected, UE 101 can generate such a trigger by one or more timers.

In some embodiments, in response to the determination that there is the trigger event, and a determination that that there is no cell of the first PLMN available, processor 201 can start a timer, e.g., timer 131, with a predetermined duration. In some embodiments, the predetermined duration can be a fixed predetermined value, which is configurable by the UE or the base station. In some other embodiments, the predetermined duration can be changed progressively, e.g., with a progressively increased offset, so that the predetermined duration can be a first value at a first time, and the first value plus the offset at a consequent time, and further increased by the offset each time the timer is used. Upon an expiration of the timer with the predetermined duration, processor 201 can search for the first PLMN to determine whether the first PLMN is available. In response to a determination the first PLMN is available, processor 201 can determine whether a cell in the first RAT for the first PLMN is available for the UE to camp on. In response to a determination that a cell in the first RAT for the first PLMN is available, processor 201 can select the available cell in the first RAT to register the UE with the first PLMN.

In some embodiments, the timer described above can be a first timer, and the UE can include a second timer, e.g., timer 133. In response to the determination that there is the trigger event, the determination that the first PLMN is available, and a determination that that there is no cell in the first RAT for the first PLMN available, processor 201 can start the second timer, e.g., timer 133, with a second predetermined duration. In some other embodiments, the second predetermined duration can be changed progressively, e.g., with a progressively increased offset, so that the second predetermined duration can be a first value at a first time, and the first value plus the offset at a consequent time, and further increased by the offset each time the timer is used. Upon an expiration of the second timer with the second predetermined duration, processor 201 can search for the first PLMN to determine whether the first PLMN is available. In response to a determination the first PLMN is available, processor 201 can determine whether a cell in the first RAT of the first PLMN is available for the UE to camp on. In response to a determination that a cell in the first RAT for the first PLMN is available, processor 201 can select the available cell in the first RAT to register the UE with the first PLMN.

In some embodiments, in response to a determination that there is no trigger event, the processor can start a timer, e.g., timer 131, with a predetermined duration. Upon an expiration of the timer with the predetermined duration, processor 201 can search for the first PLMN to determine whether the first PLMN is available. In response to a determination the first PLMN is available, the processor can determine whether a cell in the first RAT for the first PLMN is available for the UE to camp on. In response to a determination that the cell in the first RAT of the first PLMN is available, processor 201 can select the available cell in the first RAT to register the UE with the first PLMN.

In some embodiments, in response to the determination that there is no trigger event, and a determination that the first PLMN is not available, processor 201 can start a second timer, e.g., timer 133, with a second predetermined duration. Upon an expiration of the second timer with the second predetermined duration, processor 201 can search for the first PLMN to determine whether the first PLMN is available. In response to a determination the first PLMN is available, processor 201 can determine whether a cell in the first RAT for the first PLMN is available for the UE to camp on. In response to a determination that a cell in the first RAT of the first PLMN is available, processor 201 can select the available cell in the first RAT to register the UE with the first PLMN.

Figure 3:
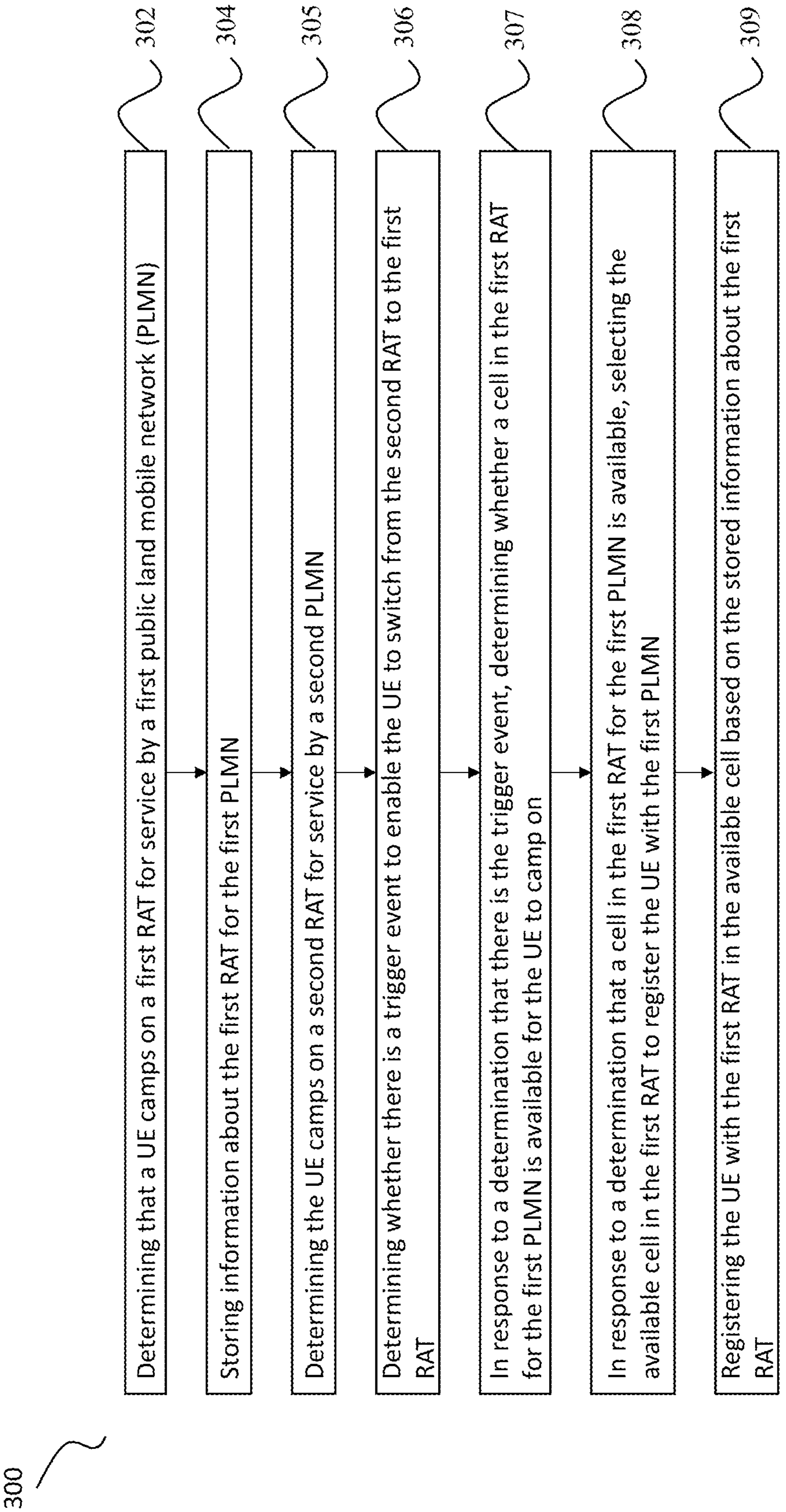
FIG. 3 illustrates an example method performed by a multi-mode UE for the reselection of a RAT among multiple RATs, according to some aspects of the disclosure.

FIG. 3 illustrates an example method 300 performed by a multi-mode UE for the reselection of a RAT among multiple RATs, according to some aspects of the disclosure. Method 300 can be performed by UE 101 as shown in FIGS. 1 and 2A-2B. For example, the functions of method 300 can performed by processor 201 or caused to be performed by processor 201.

At 302, UE 101 can determine that UE 101 camps on a first RAT for service by a first PLMN. For example, UE 101 can determine that UE 101 camps on a first RAT for service by a first PLMN, which can be a NR RAT, as the NR wireless network including base station 113 and core network 104 serviced by PLMN 103, as shown in FIG. 1.

At 304, UE 101 can store information about the first RAT for the first PLMN. For example, UE 101 can store information about a RAT 132 for the PLMN 103.

At 305, UE 101 can determine UE 101 camps on the second RAT for service by a second PLMN. For example, UE 101 can determine UE 101 camps on the second RAT, which can be the UTRAN wireless network including base station 111 and core network 102, serviced by PLMN 103.

At 306, UE 101 can determine whether there is a trigger event to enable UE 101 to switch from the second RAT to the first RAT. For example, UE 101 can determine whether there is a trigger event to enable UE 101 to switch from the UTRAN RAT to the NR RAT.

At 307, in response to a determination that there is the trigger event, UE 101 can determine whether a cell in the first RAT for the first PLMN is available for UE 101 to camp on. For example, when it is determined that there is the trigger event, UE 101 can determine whether a cell in the NR RAT for PLMN 103 is available for UE 101 to camp on. Since stored information about a RAT 132 for the PLMN 103 is saved at 304, UE 101 can perform the search of any available cell of PLMN 103 without first searching for an available PLMN for the NR RAT. Hence, operations performed at 307 can be more efficient for the reselection of the NR RAT, compared to any indirect reselection that may be supported by any other current technology.

At 308, in response to a determination that a cell in the first RAT for the first PLMN is available, UE 101 can select the available cell in the first RAT to register UE 101 with the first PLMN. For example, in response to a determination that a cell in the NR RAT for PLMN 103 is available, UE 101 can select the available cell in the NR RAT to register the UE with PLMN 103.

At 309, UE 101 can register UE 101 with the first RAT in the available cell based on the stored information about the first RAT. For example, UE 101 can register UE 101 with the NR RAT in the available cell based on the stored information about the NR RAT, information for PLMN 103.

Figure 4:
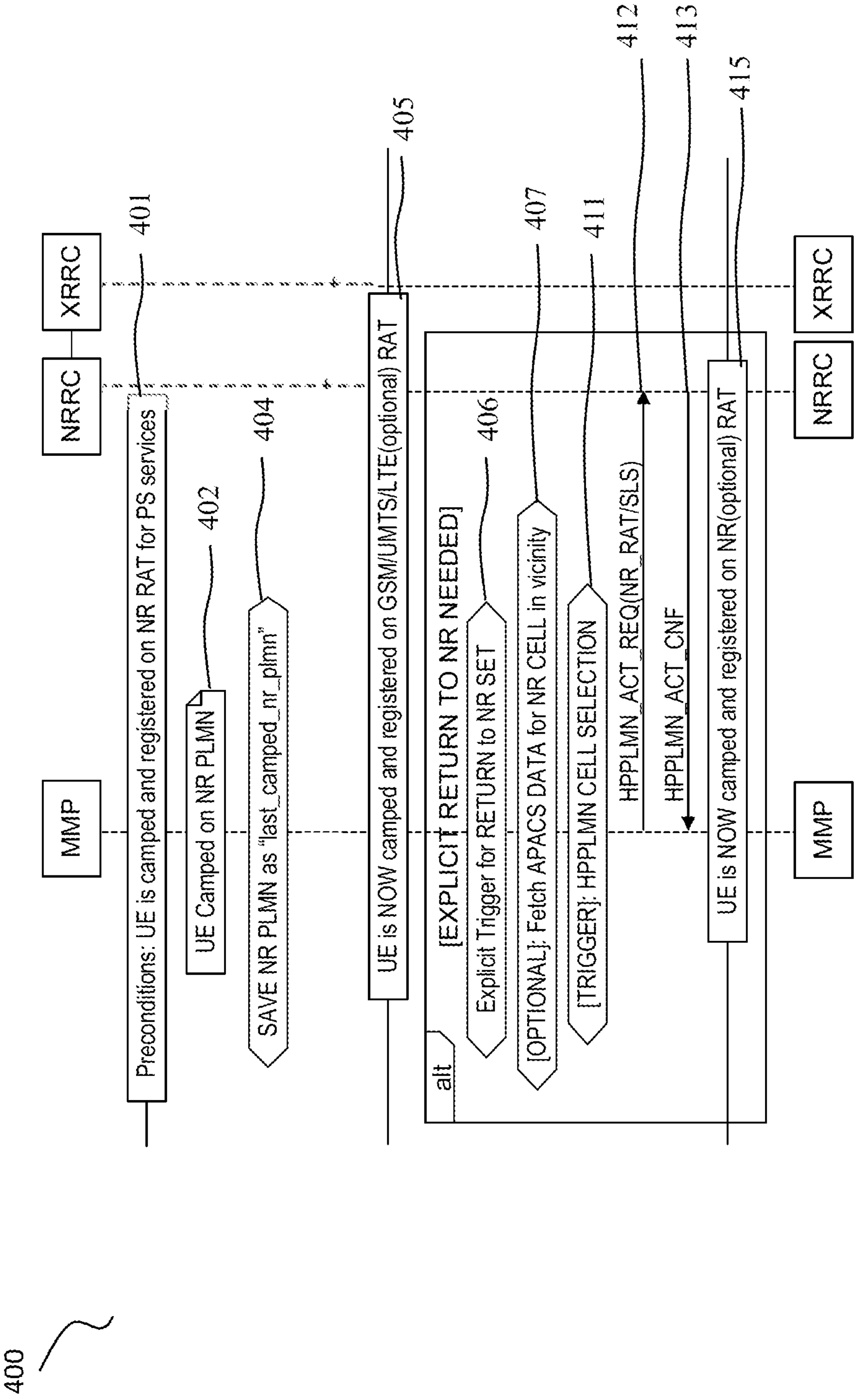
FIGS. 4-5 illustrate example sequence diagrams illustrating operations performed by a multi-mode UE for the reselection of a RAT among multiple RATs, according to some aspects of the disclosure.
Figure 5:
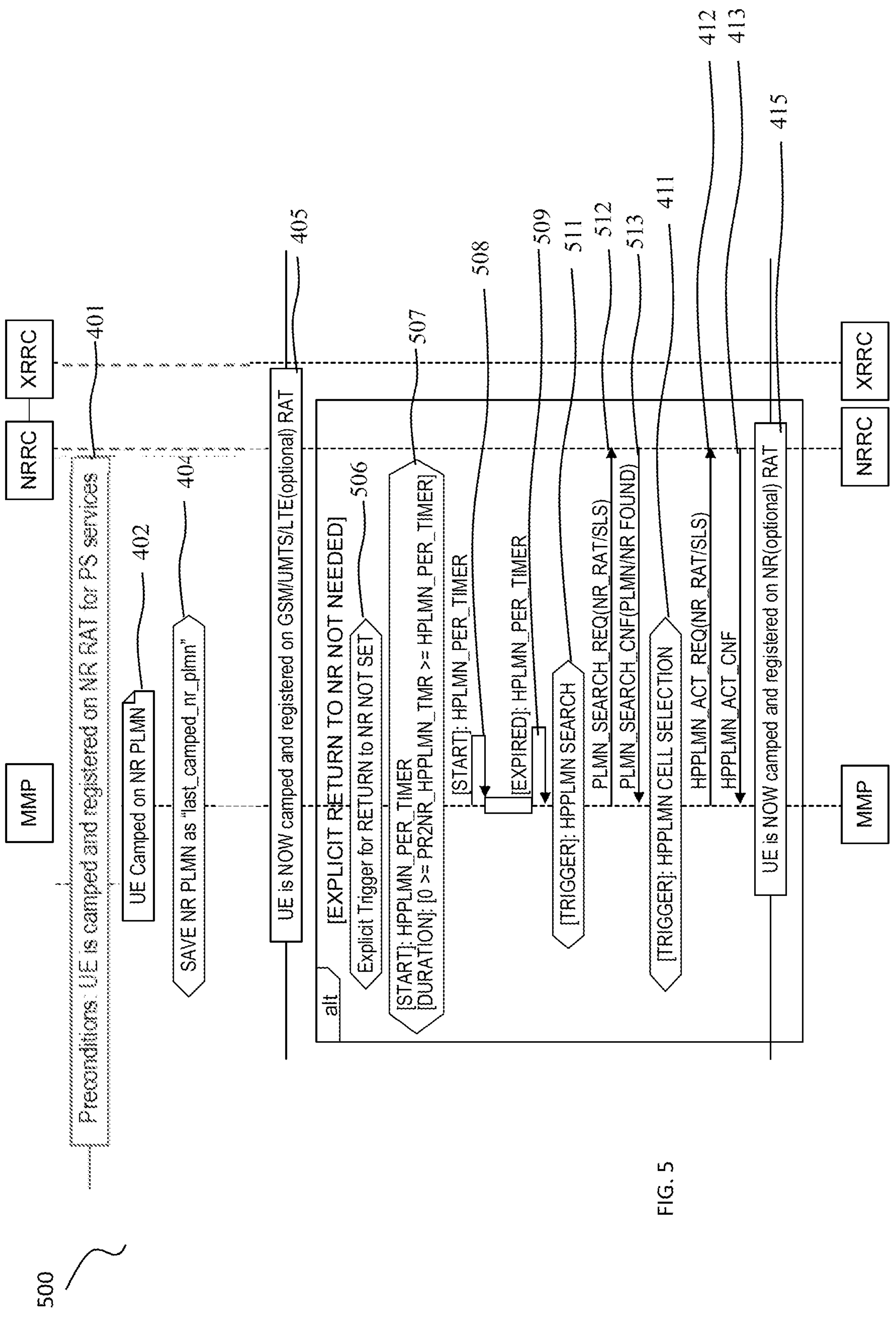

FIGS. 4-5 illustrate example sequence diagrams, e.g., sequence diagram 400 and sequence diagram 500, illustrating operations performed by a multi-mode UE for the reselection of a RAT among multiple RATs, according to some aspects of the disclosure. Sequence diagrams illustrated in FIGS. 4-5 can be examples of method 300 shown in FIG. 3. Sequence diagram 400 and sequence diagram 500 can be performed by various components of UE 101, e.g., a Mobility Management PLMN (MMP) selection module belongs to NAS layer 227 in FIG. 2B, a NR Radio Resource Control (NRRC) module belongs to AS layer 229, e.g., RRC layer 231, and other Radio Resource Control (XRRC) modules belongs to AS layer 229, e.g., RRC layer 231 for a RAT other than NR, such as the EUTRAN/UTRAN/GERAN RAT.

As shown in FIG. 4, sequence diagram 400 illustrates operations performed by UE 101 for the reselection of a NR RAT among multiple RATs.

At 401, UE 101 is camped and registered on a NR RAT for packet switching (PS) services, which may not be a circuit switched registration, and at 402, UE 101 can be camped on PLMN 103, which can be a NR PLMN. At 404, UE 101 can save information about the NR RAT for PLMN 103. At 405, UE 101 can detect that UE 101 is camped and registered in a second RAT, such as a GSM, UMTS, or LTE RAT that is served by base station 111, base station 112, base station 117 of FIG. 1. Operations performed at 401 to 405 can be examples of operations performed at 302 and 305.

At 406, UE 101 determines an explicit trigger event to enable UE 101 to return from the second RAT to the NR RAT. At 407, UE 101 can optionally fetch an access point assisted data provided by an access point to determine whether a cell in the NR RAT for PLMN 103 is available. At 411, UE 101 can perform NR cell selection for PLMN 103. At 412 and 413, an internal communication signal across layers in the baseband of UE 101 between NAS layer 227 and RRC 231 to trigger background cell selection on PLMN 103 takes place. Signal HPPLMN_ACT_CNF is an internal communication signal to confirm cell selection found in the background for PLMN 103. At 415, UE 101 can camp and register on the NR RAT to be served by the available NR cell. Operations performed at 406 to 415 are similar to operations performed at 306 to 309 as shown in FIG. 3. As shown at 401 and at 415, UE 101 starts with the NR RAT service, and finally switches back to the NR RAT, which is referred to the reselection of the NR RAT.

As shown in FIG. 5, sequence diagram 500 illustrates operations performed by UE 101 to for the reselection of a NR RAT among multiple RATs. Sequence diagram 500 includes operations performed at 401 to 405, as described for sequence diagram 400 shown in FIG. 4. In addition, sequence diagram 500 includes operations performed at 506, 507, 508, 509, 511, 512, and 513, which are described below. Afterwards, sequence diagram 500 includes operations performed at 411, 412, 413, and 415, as described for sequence diagram 400.

At 506, UE 101 determines there is no explicit trigger event to enable UE 101 to return from the second RAT to the NR RAT, which is the contrary condition to the operations performed at 406 shown in FIG. 4. At 507, UE 101 can start a timer with a predetermined duration, where the timer can start at 508 and expires at 509. After the timer expires after the predetermined duration, at 511, the expiration of the timer can be treated as a trigger for UE 101. At 511, UE 101 can perform HPPLMN search to find a PLMN in the NR RAT. At 512, at 513, UE 101 can perform background cell selection to camp on the PLMN of NR RAT. At 512, UE 101 searches for a PLMN, which may be different from PLMN 103. At 513, UE 101 can receive a confirmation of the selection of a PLMN. The PLMN selection and cell selection can be performed at background. A background selection is different from a foreground cell selection process where UE 101 does a MAKE with the new PLMN in terms of camping before BREAK with the previous PLMN in which it was camped in GSM/UMTS/LTE RAT.

At 411, UE 101 can perform NR cell selection for PLMN 103. At 415, UE 101 can camp and register on the NR RAT to be served by the available NR cell. Operations performed at 411 to 415 are similar to operations performed at 306 to 309 as shown in FIG. 3. As shown at 401 and 415, UE 101 starts with the NR RAT service, and finally switched back to the NR RAT, which is referred to the reselection of the NR RAT.

Figure 6:
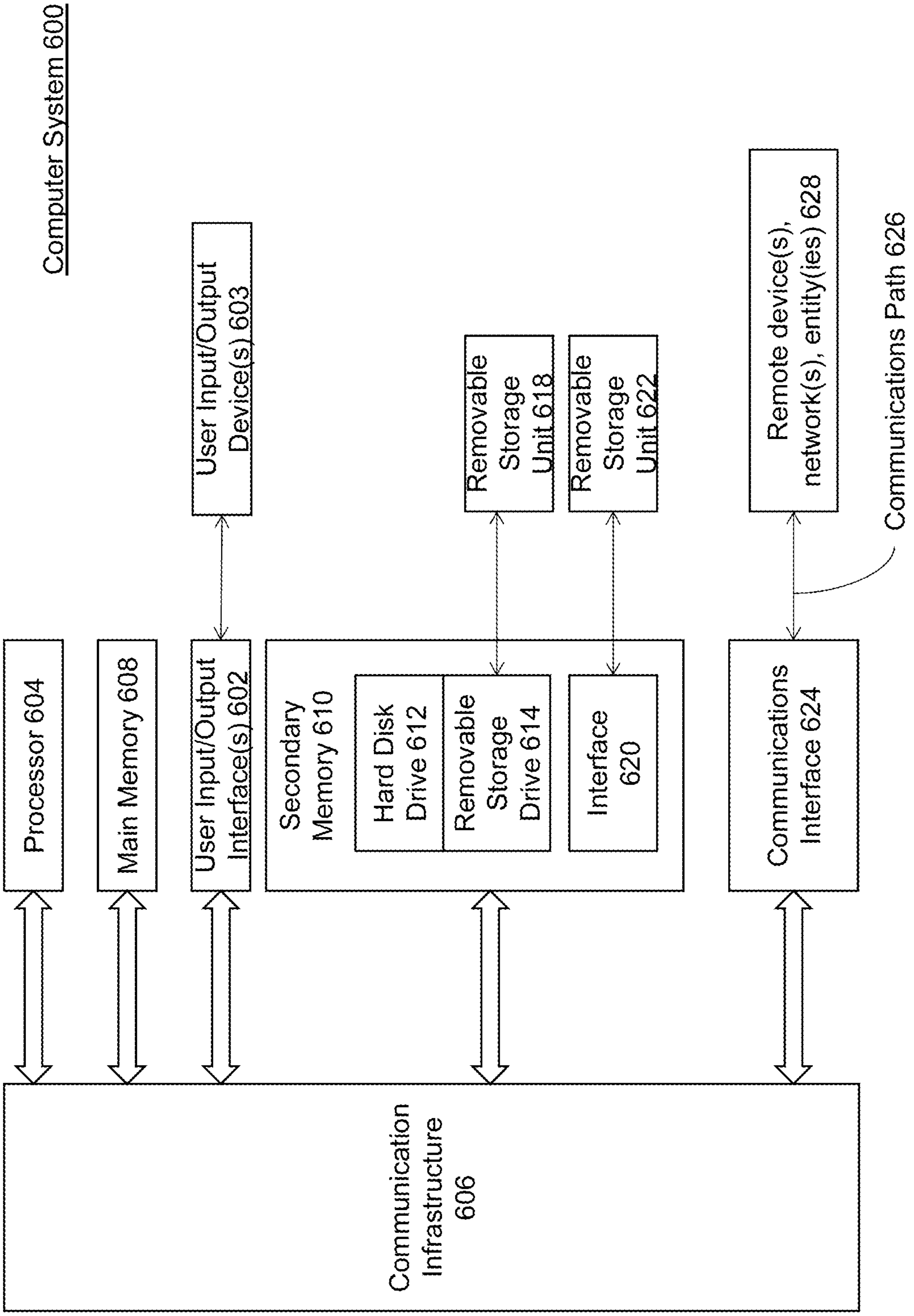
FIG. 6 is an example computer system for implementing some aspects or portion(s) thereof of the disclosure provided herein.

Various aspects can be implemented, for example, using one or more computer systems, such as computer system 600 shown in FIG. 6. Computer system 600 can be any computer capable of performing the functions described herein such as UE 101, base station 111, base station 112, base station 113, base station 115, base station 117, and base station 119 as shown in FIG. 1 and FIGS. 2A-2B, or operations described in method 300, sequence diagram 400, and sequence diagram 500 as shown in FIGS. 3-5. Computer system 600 includes one or more processors (also called central processing units, or CPUs), such as a processor 604. Processor 604 is connected to a communication infrastructure 606 (e.g., a bus). Computer system 600 also includes user input/output device(s) 603, such as monitors, keyboards, pointing devices, etc., that communicate with communication infrastructure 606 through user input/output interface(s) 602. Computer system 600 also includes a main or primary memory 608, such as random access memory (RAM). Main memory 608 may include one or more levels of cache. Main memory 608 has stored therein control logic (e.g., computer software) and/or data.

Computer system 600 may also include one or more secondary storage devices or memory 610. Secondary memory 610 may include, for example, a hard disk drive 612 and/or a removable storage device or drive 614. Removable storage drive 614 may be a floppy disk drive, a magnetic tape drive, a compact disk drive, an optical storage device, tape backup device, and/or any other storage device/drive.

Removable storage drive 614 may interact with a removable storage unit 618. Removable storage unit 618 includes a computer usable or readable storage device having stored thereon computer software (control logic) and/or data. Removable storage unit 618 may be a floppy disk, magnetic tape, compact disk, DVD, optical storage disk, and/any other computer data storage device. Removable storage drive 614 reads from and/or writes to removable storage unit 618 in a well-known manner.

According to some aspects, secondary memory 610 may include other means, instrumentalities or other approaches for allowing computer programs and/or other instructions and/or data to be accessed by computer system 600. Such means, instrumentalities or other approaches may include, for example, a removable storage unit 622 and an interface 620. Examples of the removable storage unit 622 and the interface 620 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

In some examples, main memory 608, the removable storage unit 618, the removable storage unit 622 can store instructions that, when executed by processor 604, cause processor 604 to perform operations for a UE or a base station, e.g., UE 101, base station 111, base station 112, base station 113, base station 115, base station 117, and base station 119 as shown in FIG. 1 and FIGS. 2A-2B. In some examples, the operations include those operations illustrated and described in FIGS. 3-5.

Computer system 600 may further include a communication or network interface 624. Communication interface 624 enables computer system 600 to communicate and interact with any combination of remote devices, remote networks, remote entities, etc. (individually and collectively referenced by reference number 628). For example, communication interface 624 may allow computer system 600 to communicate with remote devices 628 over communications path 626, which may be wired and/or wireless, and which may include any combination of LANs, WANs, the Internet, etc. Control logic and/or data may be transmitted to and from computer system 600 via communication path 626. Operations of the communication interface 624 can be performed by a wireless controller, and/or a cellular controller. The cellular controller can be a separate controller to manage communications according to a different wireless communication technology. The operations in the preceding aspects can be implemented in a wide variety of configurations and architectures. Therefore, some or all of the operations in the preceding aspects may be performed in hardware, in software or both. In some aspects, a tangible, non-transitory apparatus or article of manufacture includes a tangible, non-transitory computer useable or readable medium having control logic (software) stored thereon is also referred to herein as a computer program product or program storage device. This includes, but is not limited to, computer system 600, main memory 608, secondary memory 610 and removable storage units 618 and 622, as well as tangible articles of manufacture embodying any combination of the foregoing. Such control logic, when executed by one or more data processing devices (such as computer system 600), causes such data processing devices to operate as described herein.

Based on the teachings contained in this disclosure, it will be apparent to persons skilled in the relevant art(s) how to make and use aspects of the disclosure using data processing devices, computer systems and/or computer architectures other than that shown in FIG. 6. In particular, aspects may operate with software, hardware, and/or operating system implementations other than those described herein.

It is to be appreciated that the Detailed Description section, and not the Summary and Abstract sections, is intended to be used to interpret the claims. The Summary and Abstract sections may set forth one or more, but not all, exemplary aspects of the disclosure as contemplated by the inventor(s), and thus, are not intended to limit the disclosure or the appended claims in any way.

While the disclosure has been described herein with reference to exemplary aspects for exemplary fields and applications, it should be understood that the disclosure is not limited thereto. Other aspects and modifications thereto are possible, and are within the scope and spirit of the disclosure. For example, and without limiting the generality of this paragraph, aspects are not limited to the software, hardware, firmware, and/or entities illustrated in the figures and/or described herein. Further, aspects (whether or not explicitly described herein) have significant utility to fields and applications beyond the examples described herein.

Aspects have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. In addition, alternative aspects may perform functional blocks, steps, operations, methods, etc. using orderings different from those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other aspects whether or not explicitly mentioned or described herein.

The breadth and scope of the disclosure should not be limited by any of the above-described exemplary aspects, but should be defined only in accordance with the following claims and their equivalents.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should only occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of, or access to, certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

What is claimed is:

1. A user equipment (UE), comprising:

one or more transceivers configured to enable the UE to wirelessly communicate in a first Radio Access Technology (RAT) and a second RAT; and a processor communicatively coupled to the one or more transceivers and configured to:

determine that the UE camps on the first RAT for service by a first public land mobile network (PLMN);

store information about the first RAT for the first PLMN;

determine, in response to service in the first RAT being interrupted, that the UE camps on the second RAT for service by a second PLMN;

determine whether there is a trigger event to enable the UE to switch back from the second RAT to the first RAT, wherein the first RAT is more advanced than the second RAT;

in response to a determination that there is the trigger event, based on the stored information about the first PLMN, while being camped on the second RAT for service by the second PLMN, performing a search of an available cell of the first PLMN different from the second PLMN without searching for an available PLMN to determine whether a cell in the first RAT for the first PLMN is available for the UE to camp on; and in response to a determination that a cell in the first RAT for the first PLMN is available, select the available cell in the first RAT to register the UE with the first PLMN.

2. The UE of claim 1, wherein the second PLMN is same as the first PLMN or an equivalent PLMN to the first PLMN.

3. The UE of claim 1, wherein the information about the first RAT for the first PLMN includes a specific mobile country code (MCC) for the first PLMN and a specific mobile network code (MNC) for the first PLMN.

4. The UE of claim 1, wherein the processor is configured to determine that the UE camps on the first RAT for service by the first PLMN by a non-access stratum (NAS) layer of a protocol stack operated on the UE.

5. The UE of claim 1, wherein the processor is configured to fetch an access point assisted data provided by an access point to determine whether a cell in the first RAT for the first PLMN is available.

6. The UE of claim 1, wherein the processor is further configured to:

in response to a determination that that there is no cell of the first PLMN available, start a timer with a predetermined duration;

upon an expiration of the timer with the predetermined duration, search for the first PLMN to determine whether the first PLMN is available;

in response to a determination the first PLMN is available, determine whether a cell in the first RAT for the first PLMN is available for the UE to camp on; and in response to a determination that a cell in the first RAT for the first PLMN is available, select the available cell in the first RAT to register the UE with the first PLMN.

7. The UE of claim 6, wherein the timer is a first timer, and the processor is further configured to:

in response to the determination that the first PLMN is available and a determination that that there is no cell in the first RAT for the first PLMN available, start a second timer with a second predetermined duration;

upon an expiration of the second timer with the second predetermined duration, search for the first PLMN to determine whether the first PLMN is available;

in response to a determination the first PLMN is available, determine whether a cell in the first RAT of the first PLMN is available for the UE to camp on; and in response to a determination that a cell in the first RAT for the first PLMN is available, select the available cell in the first RAT to register the UE with the first PLMN.

8. The UE of claim 1, wherein the processor is further configured to register the UE with the first RAT in the available cell based on the stored information about the first RAT.

9. The UE of claim 1, wherein the processor is further configured to:

in response to a determination that there is no trigger event, start a timer with a predetermined duration, wherein the predetermined duration is based on a configurable predetermined value or a progressively increased offset;

upon an expiration of the timer with the predetermined duration, search for the first PLMN to determine whether the first PLMN is available;

in response to a determination the first PLMN is available, determine whether a cell in the first RAT for the first PLMN is available for the UE to camp on; and in response to a determination that the cell in the first RAT of the first PLMN is available, select the available cell in the first RAT to register the UE with the first PLMN.

10. The UE of claim 9, wherein the timer is a first timer, and the processor is further configured to:

in response to the determination that there is no trigger event, and a determination that the first PLMN is not available, start a second timer with a second predetermined duration, wherein the second predetermined duration is based on a configurable predetermined value or a progressively increased offset;

upon an expiration of the second timer with the second predetermined duration, search for the first PLMN to determine whether the first PLMN is available;

in response to a determination the first PLMN is available, determine whether a cell in the first RAT for the first PLMN is available for the UE to camp on; and in response to a determination that a cell in the first RAT of the first PLMN is available, select the available cell in the first RAT to register the UE with the first PLMN.

11. The UE of claim 1, wherein the first RAT includes new radio (NR) next generation Radio Access Network (NG-RAN).

12. The UE of claim 11, wherein the second RAT includes Universal Mobile Telecommunications System (UMTS) Terrestrial Radio Access Network (UTRAN), a Global System for Mobiles (GSM) Edge Radio Access Network (GERAN), or a long-term evolution (LTE) evolved UTRAN (E-UTRAN).

13. A method performed by a user equipment (UE), comprising:

determining that the UE camps on a first Radio Access Technology (RAT) for service by a first public land mobile network (PLMN);

storing information about the first RAT for the first PLMN;

determining, in response to service in the first RAT being interrupted, that the UE camps on a second RAT for service by a second PLMN;

determining whether there is a trigger event to enable the UE to switch back from the second RAT to the first RAT, wherein the first RAT is more advanced than the second RAT;

in response to a determination that there is the trigger event, based on the stored information about the first PLMN, while being camped on the second RAT for service by the second PLMN, performing a search of an available cell of the first PLMN different from the second PLMN without searching for an available PLMN to determine whether a cell in the first RAT for the first PLMN is available for the UE to camp on; and in response to a determination that a cell in the first RAT for the first PLMN is available, selecting the available cell in the first RAT to register the UE with the first PLMN.

14. The method of claim 13, wherein the processor is further configured to:

in response to a determination that that there is no cell of the first PLMN available, starting a timer with a predetermined duration;

upon an expiration of the timer with the predetermined duration, searching for the first PLMN to determine whether the first PLMN is available;

in response to a determination the first PLMN is available, determining whether a cell in the first RAT for the first PLMN is available for the UE to camp on; and in response to a determination that a cell in the first RAT for the first PLMN is available, selecting the available cell in the first RAT to register the UiE with the first PLMN.

15. The method of claim 14, wherein the timer is a first timer, and the method further comprises:

in response to the determination that the first PLMN is available and a determination that that there is no cell in the first RAT for the first PLMN available, starting a second timer with a second predetermined duration;

upon an expiration of the second timer with the second predetermined duration, searching for the first PLMN to determine whether the first PLMN is available;

in response to a determination the first PLMN is available, determining whether a cell in the first RAT of the first PLMN is available for the UE to camp on; and in response to a determination that a cell in the first RAT for the first PLMN is available, selecting the available cell in the first RAT to register the UE with the first PLMN.

16. The method of claim 13, further comprising:

in response to a determination that there is no trigger event, starting a timer with a predetermined duration;

upon an expiration of the timer with the predetermined duration, searching for the first PLMN to determine whether the first PLMN is available;

in response to a determination the first PLMN is available, determining whether a cell in the first RAT for the first PLMN is available for the TE to camp on; and in response to a determination that the cell in the first RAT of the first PLMN is available, selecting the cell in the first RAT to register the UiE with the first PLMN.

17. The method of claim 16, wherein the timer is a first timer, and the method further comprises:

in response to the determination that there is no trigger event, and a determination that the first PLMN is not available, starting a second timer with a second predetermined duration;

upon an expiration of the second timer with the second predetermined duration, searching for the first PLMN to determine whether the first PLMN is available;

in response to a determination the first PLMN is available, determining whether a cell in the first RAT for the first PLMN is available for the UE to camp on; and in response to a determination that a cell in the first RAT of the first PLMN is available, selecting the available cell in the first RAT to register the UE with the first PLMN.

18. The method of claim 13, wherein the second PLMN is same as the first PLMN or an equivalent PLMN to the first PLMN; and the information about the first RAT for the first PLMN includes a specific mobile country code (MCC) for the first PLMN and a specific mobile network code (MNC) for the first PLMN.

19. A non-transitory computer-readable medium storing instructions that, when executed by a processor of a user equipment (UE), cause the UE to perform operations, the operations comprising:

determining that the UE camps on a first Radio Access Technology (RAT) for service by a first public land mobile network (PLMN);

storing information about the first RAT for the first PLMN;

determining, in response to service in the first RAT being interrupted, that the UE camps on a second RAT for service by a second PLMN;

determining whether there is a trigger event to enable the UE to switch back from the second RAT to the first RAT, wherein the first RAT is more advanced than the second RAT;

in response to a determination that there is the trigger event, based on the stored information about the first PLMN, while being camped on the second RAT for service by the second PLMN, performing a search of an available cell of the first PLMN different from the second PLMN without searching for an available PLMN to determine whether a cell in the first RAT for the first PLMN is available for the UE to camp on; and in response to a determination that a cell in the first RAT for the first PLMN is available, selecting the available cell in the first RAT to register the UE with the first PLMN.

20. The non-transitory computer-readable medium of claim 19, wherein the second PLMN is same as the first PLMN or an equivalent PLMN to the first PLMN; and the information about the first RAT for the first PLMN includes a specific mobile country code (MCC) for the first PLMN and a specific mobile network code (MNC) for the first PLMN.

* * * * *